US011260926B2

(12) United States Patent
Schneider (10) Patent No.: US 11,260,926 B2
(45) Date of Patent: *Mar. 1, 2022

(54) FOLDING PORTABLE ELECTRIC SCOOTER

(71) Applicant: Jeffrey Schneider, Windsor, CA (US)

(72) Inventor: Jeffrey Schneider, Windsor, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 16/256,684

(22) Filed: Jan. 24, 2019

(65) Prior Publication Data

US 2019/0225294 A1    Jul. 25, 2019

Related U.S. Application Data

(60) Provisional application No. 62/621,178, filed on Jan. 24, 2018.

(51) Int. Cl.
  *B62K 5/025*   (2013.01)
  *B62K 15/00*   (2006.01)
  *B60L 50/60*   (2019.01)
  *B60L 53/80*   (2019.01)
  *B60L 50/64*   (2019.01)
  *B62D 61/08*   (2006.01)
  *B62M 7/12*    (2006.01)

(52) U.S. Cl.
  CPC .............. *B62K 5/025* (2013.01); *B60L 50/64* (2019.02); *B60L 50/66* (2019.02); *B60L 53/80* (2019.02); *B62K 15/006* (2013.01); *B60L 2200/24* (2013.01); *B60L 2220/44* (2013.01); *B62D 61/08* (2013.01); *B62K 2202/00* (2013.01); *B62K 2204/00* (2013.01); *B62M 7/12* (2013.01)

(58) Field of Classification Search
CPC .... B62K 5/025; B62K 5/026; B62K 2204/00; B62K 15/006
See application file for complete search history.

(56) References Cited

U.S. PATENT DOCUMENTS

| 6,273,206 | B1 * | 8/2001 | Bussinger | B62D 55/00 |
| | | | | 180/208 |
| 6,378,642 | B1 * | 4/2002 | Sutton | B62D 61/08 |
| | | | | 180/208 |
| 7,654,356 | B2 * | 2/2010 | Wu | B62K 5/025 |
| | | | | 180/208 |
| 9,493,206 | B1 * | 11/2016 | Oh | B62K 3/002 |
| 10,526,033 | B2 * | 1/2020 | Horiguchi | B62K 5/027 |
| 2015/0008059 | A1 * | 1/2015 | Douglas | B62K 3/12 |
| | | | | 180/206.1 |
| 2019/0217912 | A1 * | 7/2019 | Schneider | B62K 5/06 |

FOREIGN PATENT DOCUMENTS

DE         2621644 A1 * 12/1976 .............. B62M 6/00

* cited by examiner

*Primary Examiner* — Joshua T Kennedy
(74) *Attorney, Agent, or Firm* — Tatonetti IP (57) ABSTRACT

A three wheeled stand-up or sit down foldable and portable electric personal mobility vehicle for fulfilling the needs of a broad spectrum of users including the handicapped and recreational users. The personal mobility vehicle has two major parts, including a front wheel frame assembly and a rear frame chassis assembly. These major parts are configured to easily fold into a smaller size so that the vehicle can be easily transportable and more conveniently stored. Furthermore, a versatile seat and seat post are implemented to enable a user to sit or stand, and the seat can be easily removed, without tools, to create more space should a user wish.

7 Claims, 7 Drawing Sheets

FOLDING PORTABLE ELECTRIC SCOOTER

CROSS-REFERENCE TO RELATED APPLICATION

The current application claims priority to prior filed application EFS ID. 31591521, application no. 62621178. Filed on Jan. 24, 2018.

BACKGROUND OF THE INVENTION

1. Field of the Invention

The present invention relates to vehicles and methods of electric mobility transport for transporting individuals providing a choice to either stand or sit and addresses a broad spectrum of mobility needs, targeting among others, individuals with walking disabilities, leisure/recreational users, industrial/commercial users, and more particularly, to three wheeled, portable, vehicle and methods of folding, without the use of tools.

The present invention also includes other major components designed to easily fold, collapse, or remove without the use of tools, and whereas the components are in the size and weight so as any person of modest physical strength may be capable of handling said components to the point where the user may fit said vehicle into various size storage compartments or vehicles.

2. The Prior Art

Over the past 20-30 years, many types of mobility vehicles have been developed for facilitating the movement of individuals. Initially, the vast majority of these vehicles were designed for transporting individuals with disabilities that hindered their ability to walk or stand. In the USA alone, The Centers for Disease Control and Prevention estimated that 33 million Americans have a disability that makes it difficult for them to carry out daily activities; some have challenges with everyday activities, such as attending school or going to work, 2.2 million people in the United States depend on a wheelchair for day-to-day tasks and mobility, and 6.5 million people use a cane, a walker, or crutches to assist with their mobility.

Assuming there is a population of 2.2 million confined to using the "traditional" old style wheel chairs similar to U.S. Pat. No. 3,379,450A, comprising two large wheels in the back and two smaller wheels in the front, we still have a population of 35.2 million Americans that can benefit from a more versatile mobility vehicle. As electrically powered wheel chairs and scooters (for sake of time and space, we will refer such vehicles as 'electric mobility vehicles" or EMV's) attempted to adjust for the needs of the other 35.2 million Americans with mobility disabilities, many slow and bulky mobility vehicle such as U.S. Pat. Nos. 5,036,938, 489,653S1, 5,228,533A, and many others with similar artwork were designed and improved upon to give individuals suffering less extreme disabilities a way to get around with a little more dignity. These three and four wheeled, slow bulky mobility vehicles have served their niche and thousands have been sold. But for many individuals, they are just that, slow-bulky—and hard to transport in a vehicle. They also negatively stigmatize the user as handicapped. Most handicapped individuals do not desire pity nor do they wish to continually look up at someone who is standing while they are sitting in a mobility vehicle that looks like a disability vehicle.

The need to transport these slow bulky mobility vehicles did not go unnoticed and many designs came out to try and make them easier to transport such as U.S. Pat. Nos. 5,036,938 and 4,909,525. However, the shear nature of the bulky design of these vehicles makes folding and stowing of these vehicles tricky and time consuming at best.

This led to expensive and at times undesirable alternatives to fix the transport of mobility vehicles such as U.S. Pat. No. 5,482,424A and similar others which essentially are external ramps and lifts to carry mobility vehicles instead of making them easy to fit inside an RV, truck, SUV, or hatchback. In addition, this requires the user to have an expensive tow hitch installed on said car, truck, or SUV. Other alternatives to make EMV's easier to transport were to make them smaller and thus easier to transport such as pat 8,167,074B1 which is structurally designed to only handle very low speeds, requires the driver to stand the whole time, and is so light and unstable, that the patent recommends the user to actually get off the vehicle when coming to an uneven surface such as a drive way and push it past the uneven surface or pat 6,378,642B1 which is also designed for low speeds and its size lends to stability issues—and although it allows for standing or sitting, it breaks down into 3 major parts that are chunky and requires user to disassemble the scooter. To address the problem of disassembling a scooter for transport, such patents like U.S. Pat. No. 7,124,849B2 which besides targeting solely the disabled, is designed to fold vertically and unfortunately, retains its full length, limiting the vehicle size it may be transported in and does not account for any means of reducing its weight for frail users to lift. Like U.S. Pat. Nos. 7,124,849B2, 9,493,206B1, is also designed to fold upright but does not have the option of a seat and seems to also be designed for very light use and due to its battery location, limits it to a small battery, short range, and aesthetically not pleasing.

As technology advanced, EMV's were repurposed to not only cater to the disabled, but also toward leisure, and increased work efficiency. One of the first commercially launched electric mobility vehicles was the 2 wheeled Zappy scooter U.S. Pat. No. 5,848,660A which was a stand up and balance type of vehicle and not viable for most disabled individuals. It was mostly used for recreation but legitimized electric mobility vehicles of many configurations as well. EMV's started to become sleeker and faster appealing to the younger generation. It is prudent to note that many of these new fun mobility scooters evolved with numerous patents and designs for folding so as to transport them easily, thus solidifying the idea that transporting mobility scooters was a big issue. This segment of EMV's transformed into a multi-million dollar industry. The use of EMV's was now being used for the disabled, for recreation, and then commercial uses materialized.

It did not take long for commercial applications to evolve for EMV's. In the past, workers who had to cover large distances in the work place had to either walk, or if they were lucky, drove a motorized golf cart to save time and energy. As of May 2017, the United States Department of Labor estimates there are approximately 952,000 warehouse workers in the USA alone. They also estimate that the average hourly wage was $19.63/hour for these workers. Many businesses now realize that the time saved moving employees around faster, increases productivity and the use of smaller EMV's that can pass through doorways and other tight spaces is invaluable. Hook a trailer or other storage assemblies to the EMV and now it functions as a personal work truck, able to haul products around facilities quickly and efficiently. The need for EMV's in industrial settings spawned such patents like 2009-0255747 and was designed heavy and bulky which would limit its use solely for industrial purposes.

Other commercial personal transport applications unfolded in the form of rental tours, police, security guards, mail carriers, and others. These were mainly exploited by expensive and highly sophisticated EMV's like the two wheeled, Segway publication no. 2008-0105471, and pat USD551592S1. However, these EMV's exclude a large portion of the commercial market share due to their complexity and cost. In addition, the simple two wheeled EMV's like the Zappy and the highly complicated, self balancing EMV, like the Segway require the ability to balance, stand, or possess cognitive skills excluding most individuals with disabilities.

As EMV's evolved, it became clear that most of the patents tended to focus on one of these three categories (individuals with disabilities, recreation users, commercial users) and while some EMV's uses may fall between one or two of these categories, most of them really do not fit into all three. In addition, most of the prior art sacrifice something in their designs. The smaller, lighter, three wheeled EMV patents that claim can fold are slow, and in an effort to make them very light weight, ironically sacrifice stability for their target audience who are typically old or disabled and more prone to balance issues. Though a three wheeled platform is stable, it can still tip because a person standing or sitting on a light weight platform tends to distribute the weight from a low center of gravity to a high center of gravity which can cause the EMV to tip easier. Consequently, heavier and larger EMV's are more anchored to the ground and if engineered correctly, as much weight as possible will be distributed to a low center of gravity for best results. It should also be noted that the prior art of most of the light weight EMV's and some heavier ones comprise tiny wheels which can prove dangerous on potholes and uneven surfaces. Due to their bulkiness and weight, the heavier and larger EMV's, like U.S. Pat. Nos. 4,947,955 and 6,176,337B1, though more stable than super light vehicles, sacrifice the ability to be transported easily. Presently, there are limited practical solutions for multi demographically desired EMV's that fold easily and neatly while preserving the strength and aesthetics.

For these and other reasons, this novel invention is aimed at resolving and addressing numerous disadvantages of the prior art, presenting a stable platform that can cross the boundaries of all three of the above target groups with significant advantages and improvements and appealing to a majority of the population that can benefit from EMV's.

SUMMARY OF THE INVENTION

In the embodiment of the present invention, it is provided a portable and foldable electric personal transporter that is commercially viable to not only fulfill the needs of individuals with walking disabilities, but also cross the boundaries into leisure/recreational users and industrial applications, and whereas the individual may stand or sit at any chosen time.

It is therefore one objective of this new invention to present a three-wheel, multi-use, portable, foldable, battery powered electric vehicle.

In a related embodiment, the present invention comprises two major parts, a front wheel frame assembly and rear frame chassis assembly.

In a related embodiment, the further objective of this invention is to present said two major parts in which they may be easily folded into a smaller size so as the folded embodiment may be loaded, unloaded, transferred, or stored into most RV's, SUV's, hatch backs, planes, trains, buses, or buildings.

In an alternative and related embodiment, this invention comprises five major parts: First, a folding steering column, Second, the front frame assembly, in which the folding steering column is attached, Third, the rear chassis in which Fourth, a detachable seat and seat post, and Fifth, a removable and self contained battery pack integrates, further allowing this invention to fold and or break down without tools, into lighter, smaller components, providing for easier lifting and convenient battery charging either internally or externally from the scooter.

It is another objective of this new invention to present a newly developed strong, yet simple method folding mechanism. Unlike the prior art, this new invention comprises a dual beam support member integrated into the front frame. Said frame comprises two support beams designed in a way to converge and attach to the front steering tube. Said dual beams jut back from the front steering assembly and curves outward, back, and downward toward the rear chassis. The dual beam frame comprises a horizontal cross member at the point where it bends downward, strengthening the frame, comprising respective points that attach to the rear chassis at two pivot points, continuing below the frame of the rear chassis, comprising another horizontal cross member tying the two beams together. The bottom horizontal crossmember comprises a centered upward facing male threaded end that secures the front frame assembly to the rear chassis with a hand nut when in the unfolded (ready to drive) position.

In a related embodiment of the folding mechanism, it is a further objective to present a mechanism that allows the scooter to fold (ready to stow or transport) into a stable tripod stance without the scooter battery or frame touching the ground. In its preferred embodiment, the mechanism comprises a fork comprising a small wheel at the bottom of said fork. Said fork is centered under the bottom horizontal cross member of the dual beam frame and angled in such a way that when the scooter is in the unfolded (ready to use) position, said fork and wheel tucks neatly under the rear chassis and out of the way. Conversely, when engaging the scooter into the folded position, the fork and small wheel will swing down, while simultaneously the rear chassis will tilt downward (allowing for the lowest folded profile) pivoting on the two rear wheels until the fork with small wheel touches the ground. The complete folded position now forms a stable stance while allowing the scooter to roll and making it easy to stow into cargo holds or any space that rolling benefits from. In an alternate embodiment, instead of a fork with wheel, the mechanism may be substituted with a simple kick stand angled in the same way as the fork system design and will drop down when unfolding forming a stable tripod platform as well.

It is also another objective of this invention to present in its preferred embodiment, a versatile standing, sitting, or combination thereof EMV, whereas the easily removable seat and seat post is placed far enough back on the floor deck to allow standing or sitting without the need to adjust or remove the seat. In addition, the seat post is easily removed without tools should the user wish to remove it for extra floor space or to make room to for storage, or to transport in a vehicle.

A further objective of this new invention is to present a highly maneuverable vehicle that can be used indoors or outdoors, able to fit through a standard size doorway, has a range of speed and frame strength to not only attract persons with walking disabilities, but attract those who will desire to use it for leisure, or commercial/industrial purposes.

In Conclusion, it is presented here an electric mobility vehicle with all combined features no other EMV had presented making it novel, useful, and desirable for the populations described herein.

It should be noted that after viewing the prior art, many are written in such a way as to just secure a patent while failing to present commercially viable or desirable inventions—which in itself is a waste of time. To differentiate themselves to patent, some prior art limited segments of the populations, some art is solely designed for standing only, some prior art is designed for sitting only, some prior art will never be put to market because it is not practical, and some prior art is not designed with thought of appearance. Why must an EMV must be designed solely to cater to the walking impaired, or towards recreation populations, or to industrial uses? If disabled users can safely use and ride on the same platform as individuals who use it for recreation, why would they want to stigmatize themselves to an EMV that is made just for the disabled? Why does an EMV designed for industrial uses need to be large heavy and bulky to be used in warehouses, for security, etc. The features and size of this novel and useful invention are designed to encompass all three populations. Because of its features and size, it is not only more commercially viable, but it has a better chance at success in the market.

Thus, the numerous novel features and characteristics of the new invention presented here and combined together, and which are explained more broadly below, make a significant change and improvement in the currently known EMV's for the groups of populations described herein.

Moving forward, with all features combined, this invention comprises two major parts and two minor parts.

The first major part is the front half of the EMV or the front wheel assembly comprising a steering handle mounted on a steering column. The steering handle comprising left and right handle grips, comprising a twist throttle with a forward and reverse button on one handle side to regulate speed and direction of the EMV by sending a signal via electrical wire to a central instrument junction box, which in turn connects to a controller unit—the controller which is interconnected with the battery pack, will send the proper amount of electricity or polarity for direction to the motor from the battery pack—comprising on one handle, a USB charge port which allows users to charge phones, tablets, etc. and is connected to the central instrument junction box to where it is interconnected with an inverter and the battery pack—comprising a hand brake mounted on one handle side opposite the twist throttle and connected to brakes at the motor via a brake cable—comprising a horn button on the same side of handle as the hand brake and electrically connected to the central instrument junction box, comprising a central instrument junction box mounted on the center top of the steering handle, and said instrument comprises a key ignition, LED headlights, a horn, a display to show the status of the batteries, status of the ignition, and warning lights.

Moving down, the steering assembly which may be telescopically adjusted, slides into the steering column folding structure, and is secured in the desired height with the use of an eccentric clamp. Said folding structure comprises an eccentric clamp at the top of structure to secure the handle bars, a pivoting hinge with a locking clamp lever at the bottom of the structure allowing the handlebars to fold down, and below locking clamp, the structure is semi permanently mounted to the lower steering column, (or if necessary, removed with use of a wrench). Though not a new idea, a folding handlebar is the first part of making an EMV easily storable or transported in a vehicle. The user simply unlocks the pivot hinge clamp and folds the steering column with handlebars down—now the EMV will fit in most hatch backs and SUV vehicles plus it can be stored in tighter areas such as under shelves in a garage. This feature alone is all that some users will need but by itself limits other users who need and want even more versatile transportation.

Integrated into the sides of the lower steering column, comprise outward, rear, and downward facing dual beam support frame members which may be made of solid or hollow steel, aluminum, or any other strong material and which also serves as a conduit to run power wires from the battery in the rear chassis to the motor and controller of the front frame assembly. Continuing downward from the steering column tube comprises a fork with respective left and right legs (and borrowing from my previous patent application Ser. No. 15/872,951) comprising a notched rabbet type joint on one leg comprising a controller box with corresponding rabbet type joint so that the controller box mounts flush to the fork leg between the wheel and the fork leg. The controller box comprises a processor to control the EMVs functions, an electrical connector at the top of the controller box connecting the wires from said instrument junction box and connecting to the battery pack, a bottom connector connecting power and signals to the motor. The controller design and location make diagnostic and repair easy and the rabbet joint controller mounts seam lessly using what was otherwise wasted space and blends in with no unsightly boxes or mounting structures. In its preferred embodiment, the controller will have a two speed limiter button (for more control, a dial adjustment may also be used) to limit top speed to 8 mph in one setting or up to 16 mph in full speed setting so those who require speed limitations have that choice. Now continuing past the controller to the bottom of the fork legs the left and right legs comprise brackets to accept the left and right axles of the electric hub motor wheel and tire.

Continuing with the summarization of the front major part presented here, referring back to the dual beam frame support member, in the preferred embodiment, each beam is connected respectively to the left and right sides of the steering tube bending back towards the rear chassis and then bending perpendicularly downward of the rear chassis. At the point the frame bends downward, a horizontal cross member provides strength for both vertical and horizontal stresses. Below the horizontal cross member comprises left and right pivot holes on respective beams that will be explained in more depth later, and continuing down from said pivots holes, the beams comprise a bottom cross member, comprising an upward and centered threaded male bolt and comprising a centered angled backward and downward fork and wheel. The dual beam frame addresses problems with the prior art. The problems with folding EMV's are ease of folding, the strength of the EMV, and the aesthetics. Much of the prior art has few folding alternatives for three wheeled EMV's and the art that does, tends to have complicated folding mechanisms, mechanisms that are too weak by design due to light scooter size and weight, or are meant for the rear chassis to fold upward into vertical position limiting battery placement and size. In the process, many of the prior art designs are aesthetically not pleasing and limit the scope of the EMV to very light use. Most of the prior art folding mechanisms employ a single hinge centered with the EMV. This focuses all stresses on a single point and especially on the horizontal axis. On two wheeled EMV's, this is not as important because of the relatively narrow platform, which, when stresses are place from side to side, the whole EMV tilts. But, on most three wheeled EMV's, the rear platform does not tilt when stresses are applied and because the standing platform is wider than two wheeled EMV's, lateral stresses on the hinges are increased when going over uneven surfaces. The increased stresses at a single point create either a weak point in the EMV's folding point or requires a robust folding mechanism which can be costly and bulky. The dual beam frame addresses these issues by distributing the stress points through two hinges and more importantly, because the front chassis frame connects to the rear chassis frame at two wider points instead of a single point, creates a much stronger and more stable union. In addition, the frame is notched respectively at the pivot points to create an almost seamless frame at the union of front wheel assembly to rear chassis, protecting the aesthetics of the design.

In yet another embodiment of the invention, though not preferred, the dual beam frame does not include the small kick out fork with wheel nor a kick stand which when the scooter is in the folded position, will leave the rear chassis to rest on the ground instead of a wheel or kick stand.

In yet another embodiment of the invention, though not preferred, the dual beam structure may attach to the rear chassis at pivot points at the front sides of the rear chassis and or underneath the rear chassis.

In yet another embodiment of the invention though not preferred and previously explained why, the rear chassis' upward facing posts are moved closer to the center of the chassis and a centered single beam support structure connects and pivots between said posts. At the bottom rear of said single support structure comprises a threaded bolt to slide into or out of the "U" shaped notch in the rear chassis, comprising an angled kick out wheel below said threaded bolt.

Attached to the bottom crossmember, the final components of the front major part comprise an upward facing threaded bolt under which comprises a rear facing and angled fork, comprising a wheel. In the preferred embodiment, the user simply removes the hand twist nut which when the EMV is in the ready to use, unfolded position, secures the front chassis to the rear chassis ready for operation. With hand twist nut removed, the front frame assembly pivots back and down while simultaneously the kick out fork with wheel, swings down to the ground. Once the kick out wheel touches ground, the weight of the front frame assembly is supported on the kick out wheel and continues to fold backward pivoting on the respective frame beam hinges and lays flat upon the floor deck. The user may now fold the handle bars further compacting said EMV or simply leave the handlebars fully extended while in the folded position. Now, said EMV may be conveniently stowed in a vehicle, or because when folded, it is still on three wheels, user may easily role the entire EMV into a desired location or space on the ground.

The second major part of the EMV presented here is the rear chassis assembly in which the user stands or sits while driving. The rear chassis comprises a rectangular frame constructed of square or round tubing made of steel, aluminum, or other strong materials, comprising at least three cross members. The first two cross members, besides providing strength and rigidity, are spaced apart as to allow a removable battery pack (minor part 1 to be discussed later) to fit between. Under crossmembers comprise a metal strap cage recessed under the frame at a depth to allow removable battery pack to sit flush. The second and third cross members are spaced apart to allow a seat post (minor part 2 to be discussed later) mounting bracket to be placed in the center rear of the chassis assembly comprising a rectangular plate with four threaded holes placed at the four corners of the plate and comprising a cylindrical receiver shaft hole in the center of the plate to receive seat post. The front frame edge comprises a horizontal and centered "U" shaped notch and two upward facing posts. Respectively, the "U" shaped notch allows the threaded bolt from the dual beam support to engage or disengage from the rear chassis easily and securely and the two upward facing posts comprise pivot holes in which both posts and pivot holes are respectively aligned to accept the pivot points of said dual beam structure.

An axle is mounted under and towards the rear of the chassis whereby respective left and right wheels are mounted. Accordingly, the platform that the user stands on comprises a plastic injection molded deck formed with mud guard fenders over the rear wheels which attaches to the frame with screws and covers the frame chassis, comprising a rectangular opening over the battery pack housing allowing the battery pack to be removed, comprising a respective rectangular opening to allow a seat post to be installed and removed. On top of the plastic deck comprises a durable, slip resistant, removable rubber floor mat on which the user will stand or rest his/her feet. Like the plastic deck, the rubber floor mat comprises respective openings for the seat post but unlike the plastic deck, there is no opening over the battery pack because it is meant to cover the entire floor. In the preferred embodiment, the rubber floor mat will have a centered slit between the back of the mat and the seat post hole so as the whole mat need not be removed when removing or installing the seat post.

Referring to minor part 2 (seat post and seat) and continuing with the idea of no tools required and easy transport, the seat post comprises a tubular shaft comprising an eccentric clamp at the top, comprising a horizontal rectangular face plate with holes for hand screws at each corner and located approximately 2 inches from the bottom of the shaft. The rectangular face plate respectively fits over the rectangular seat post bracket and the remaining 2 inches of tubular pipe slides into the receiving hole in the center of the seat post mounting bracket. A seat with a downward facing tubular male post will mate with the female top of the seat post and is secured with the eccentric clamp. Height of the seat may be adjusted by inserting removable pins in respective holes in the seat post that would correspond to holes in the male downward post of the seat. In the invention presented here, the seat and seat post are easily removed because the bottom of the seat post fits securely into the recessed frame and it can be used without fasteners and for those who prefer extra tightness, or to keep the seat post from lifting out, the seat post may be fastened using screws with finger grip heads requiring no tools. Depending on how the user mounts the post, the post may be removed as quickly as 1 second or with finger screws, around 15 seconds. The seat post is tall enough and specifically centered sufficiently back so as the user may stand or sit comfortably without needing to remove the post nor require bulky and complicated folding seat post mechanisms which are impractical and unsightly. Accordingly, in the preferred embodiment, the seat post will be installed and allows the user the flexibility and choice of whether to stand, sit, or a combination thereof and which does not limit groups of populations that the prior art address as stand only or sit only EMV's.

Referring now to minor part 1 (removable battery pack). The removable battery pack comprises a plastic housing, comprising a rubber top to cover the batteries, comprising two electrical connectors—one connector supplying power from the battery to Major part 1, the other connector to function as the charge port. The top of said battery pack comprises a strap in which the user may easily remove said battery pack from the EMV with one hand. In the preferred embodiment, an additional charge port is mounted on the floor deck or the edge of the frame, then wired and connected to the charge port of the battery pack. It should be noted that depending on the needs and requirements of the user, the choice of batteries placed in the battery pack housing may vary in weight and power density. Between lithium and lead acid batteries, the battery pack can weigh as little as 10 lbs. or as much as 38 lbs. allowing almost anyone, no matter how weak or strong, to remove the pack. In any event, should the user desire to transport the invention presented here, and deems the complete EMV is too heavy to lift, the user simply, unplugs the power line from the battery pack, lifts the rubber mat up, grasps the battery pack strap, and removes it. The process takes less than 10 seconds and reducing the weight by 10-38 lbs. In addition to reducing the weight for transport, an easily removable battery pack also allows users to charge the pack outside the EMV which additionally benefits users by providing them flexibility where to charge, plus users have the option to purchase additional battery packs ready to swap out a depleted battery pack in seconds. This reduces any downtime to wait for a battery pack to be charged which is a huge plus for all populations focused on here, but especially for industrial and scooter rental purposes. It should be noted, that the battery pack is designed to be hidden under the floor deck. This is for a couple of reasons. First, this allows the floor deck to be flat—a flat floor deck is key to appealing across the 3 populations we are targeting here. Many EMV's have unsightly battery packs mounted on top of the floor decks which require the user to lift his/her legs over the battery pack when mounting or dismounting the vehicle. Disabled-Persons with mobility issues often find it painful lifting their legs. In addition, the flat deck provides more room for the user's feet to be comfortably placed. Additionally, recreational/leisure users also desire the flat floor deck because like users with disabilities, they find that the extra space for their feet and belongings is more comfortable, plus it is more streamline not having a bulky battery pack in view. Commercial/industrial users, along with enjoying the same benefits that disabled and recreational users do, find that the added real estate provided by a flat deck gives the user useful space to place boxes and other forms of cargo, or even an additional passenger on the deck (especially with the seat post removed) and can move their cargo quickly and efficiently. The 2nd reason the battery pack is placed under the floor deck is to create a low center of gravity, providing extra stability, a better ride, and better safety from tipping.

DETAILED DESCRIPTION

Figure 1:
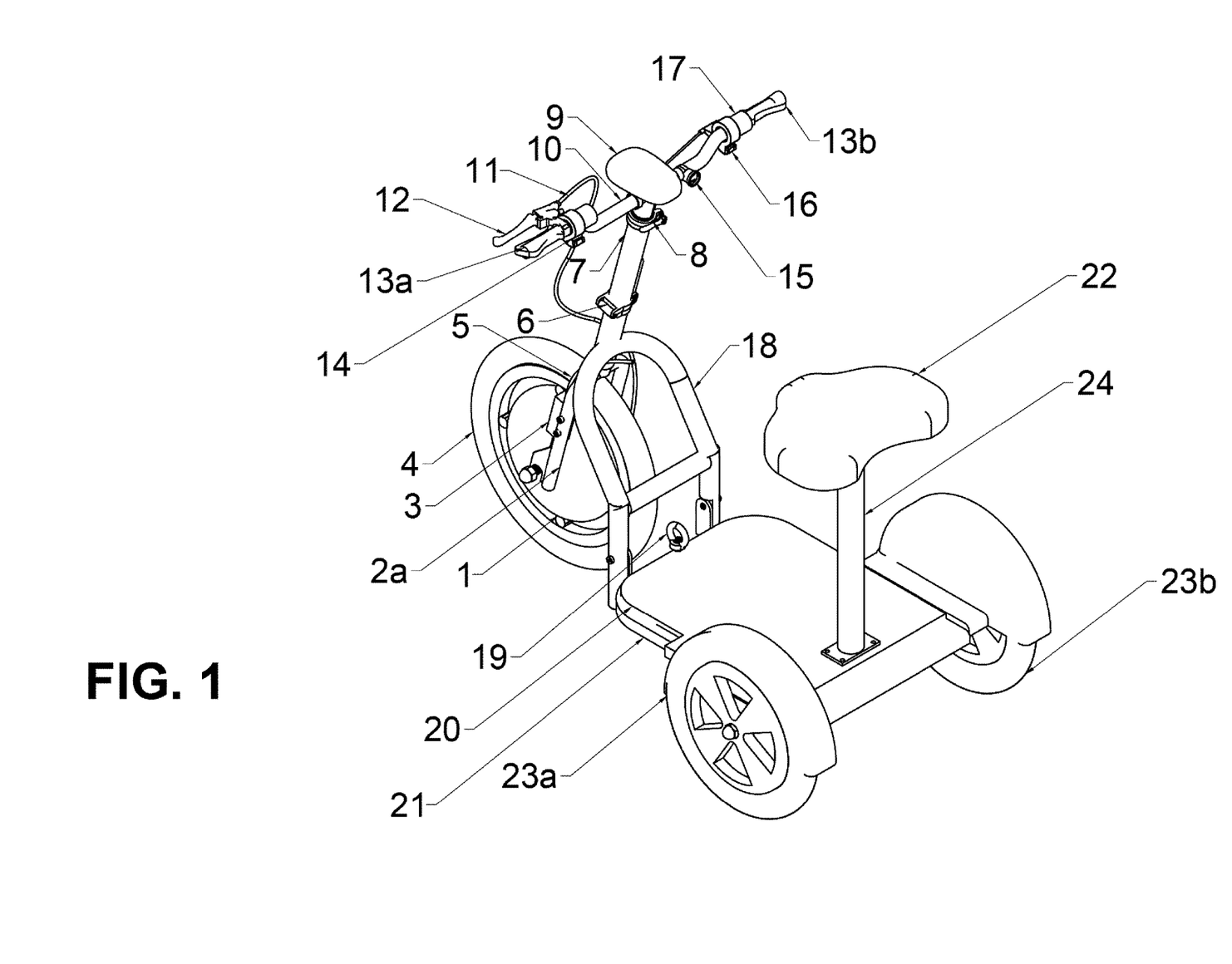
FIG. 1 is a top perspective of the electric mobility vehicle of the present invention.

The new and improved invention presented here (FIG. 1 FIG. 2 FIG. 3) is a foldable, transportable, battery powered, three wheeled electric mobility vehicle (EMV) or electric scooter comprising a unique structural and folding mechanism, whereby said EMV may be quickly and safely folded into various sizes, and comprises a removable seat and battery providing flexibility for users by allowing user to make said EMV lighter, smaller, and such that most users may easily lift or remove certain components which enable the user to conveniently store, and or transport. More specifically:

FIG. 1 is a rear side perspective view of the present invention and starting at the top, the preferred handlebar steering assembly 10 mounted into the steering column folding structure 7; said steering assembly 10 comprises a left hand grip 13a and moving right, a hand brake 12 connected to a brake cable 11, a horn button 14, moving to the center, a key activated ignition headlight instrument 9, and continuing right, a dual USB charge port 15 to charge cell phones or tablets, a forward/reverse button 16 to allow respective movement directions, a twist throttle 17 in which both forward/reverse button 16 and twist throttle 17 connect to the controller 3 through an electrical wire 5, and right hand grip 13b.

Moving downward from handlebar assembly 10, the steering column folding structure 7 comprises eccentric clamp 8 at the top that allows for height adjustment of handlebar assembly 10, comprising a hollow tube, comprising a hinged folding mechanism 6 to allow handlebar assembly 10 to easily fold downward and to the side of the front wheel.

Folding structure 7 which includes both eccentric clamp 8 and hinged folding mechanism 6, connects to the lower steering column and fork assembly 2a and 2b respectively. Moving down fork 2a comprises the controller 3. Power and all corresponding handlebar wiring is interconnected through wire harness 5 which runs along or through hollow dual beam support structure 18 to the top of controller 3. Controller 3 connects to the front electric hub motor 1 in which a tire 4 is mounted. At the lower end of fork 2a, and seen from FIG. 2,3 fork 2b, electric hub motor 1 which comprises threaded axles running horizontally through it, mounts to respective fork flanges with nuts. On the right side of electric hub motor 1, and as seen from FIG. 2,3, said brake cable 11 connects to drum brake lever 24 completing the brake system.

Referring back to the dual beam frame support structure 18 mentioned earlier, the upper portion of said structure, is welded to the respective left and right sides of the steering column frame. Respective beams curve outward, back, and downward. Comprising a cross member midway down at the point the dual beams bend to a vertical position comprising respective left and right pivot points that mate with corresponding upward vertical posts of the rear chassis frame. The vertical posts of the dual beam structure continue below said pivot points and at its base, comprises a second horizontal crossmember seen more visibly in FIGS. 3,5,7,10. Said second crossmember comprises a fork 25 and wheel 26 seen in FIG. 2,3,5,6,7,9 that act as a support mechanism swinging down during folding and forming a rolling tripod. Above said fork and wheel, comprises threaded bolt 29 FIGS. 2,7,9,10 used to secure front frame assembly to unfolded ready position with the use of hand twist nut 19 seen in FIG. 1,2. This completes Major part 1 (front wheel assembly/chassis).

Continuing to the lower rear portion of the presented invention, FIG. 1 generally shows the floor deck 20 which comprises a removable rubber floor mat upon an injection molded plastic floor deck with fenders. Under said floor deck 20 comprises the rear chassis frame 21 comprising removable seat post 24, removable/adjustable seat 22, left wheel 23*a*, right wheel 23*b*, and hand nut 19.

Figure 2:
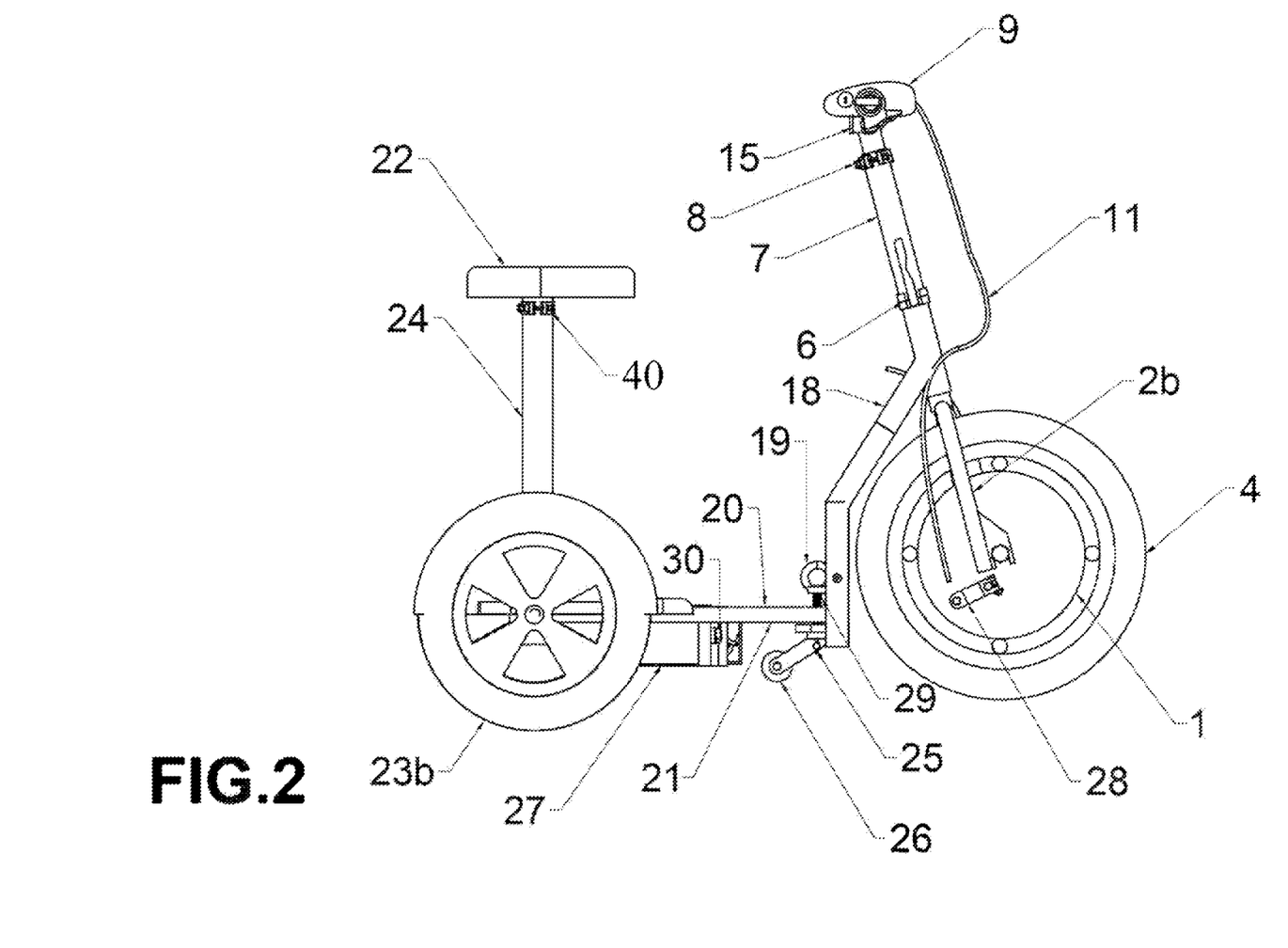
FIG. 2 is a side elevation of the present invention.

FIG. 2 illustrates the views that are hidden in perspective FIG.1 in which seat post 24 comprises eccentric clamp 40, folding structure 7 comprises locking lever for folding structure mechanism 6, front motor 1 comprises drum brake lever 28, dual beam structure 18 comprises threaded bolt 29, kick out fork 25, and kick out wheel 26, and rear chassis frame 21 comprises battery cage 27, comprising battery pack 30.

Figure 3:
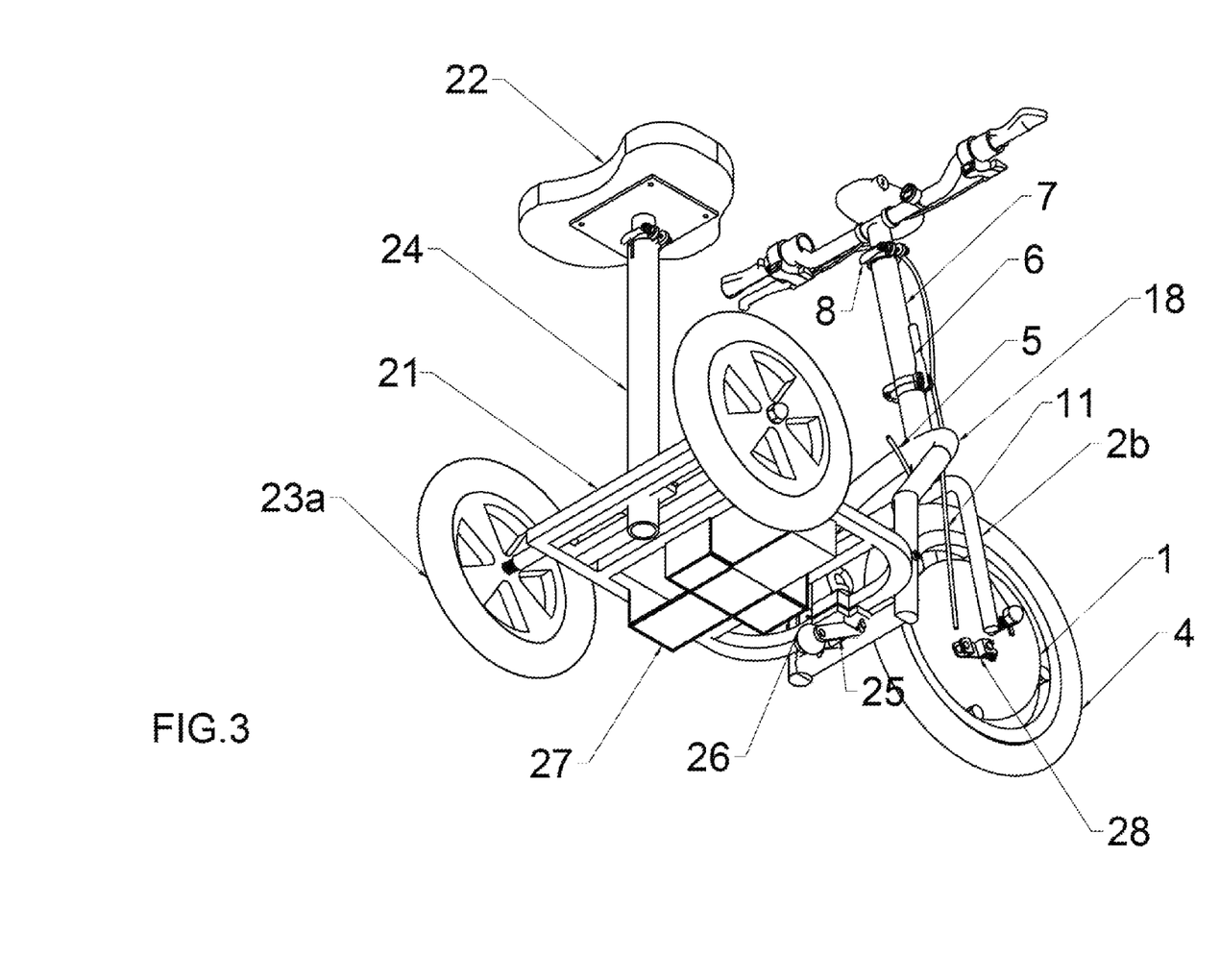
FIG. 3 is a bottom perspective view of the present invention.

FIG. 3, depicts most of the what is seen in FIG. 2 but from a bottom perspective view of said EMV with battery pack 30 and floor deck 20 removed and in the unfolded-ready to use position.

Figures 4, 5, 6:
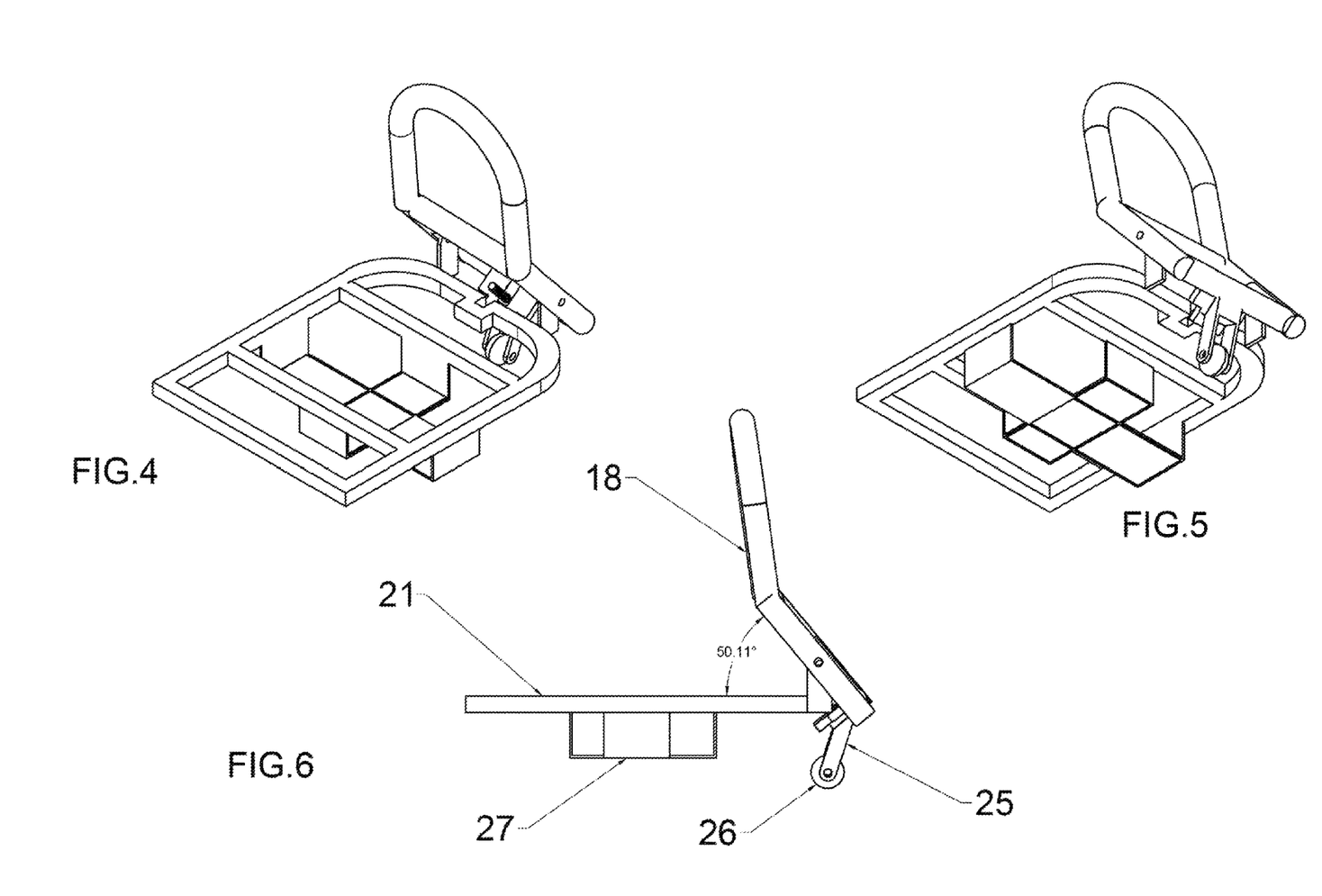
FIG. 4 is a top perspective view of the frame with dual beam partially folded.
FIG. 5 is a bottom perspective view of the frame with dual beam structure partially folded.
FIG. 6 is a side view of the frame with dual beam structure partially folded.
Figures 7, 10:
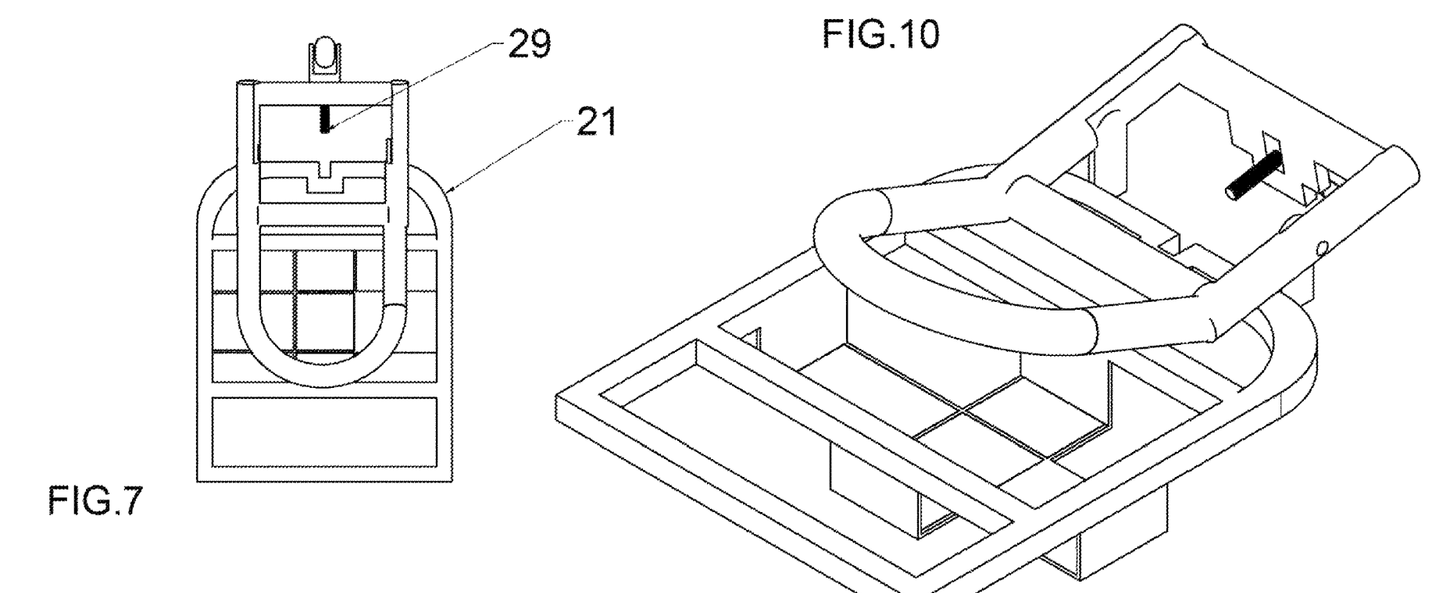
FIG. 7 is a top view of the frame with dual beam completely folded.
FIG. 10 is a top perspective view of the frame with dual beam completely folded.
Figure 8:
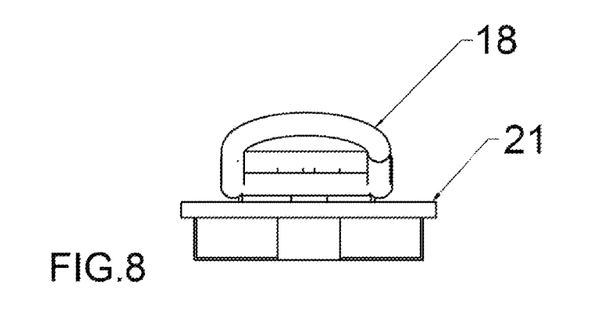
FIG. 8 is a rear view of the frame with dual beam completely folded.
Figure 9:
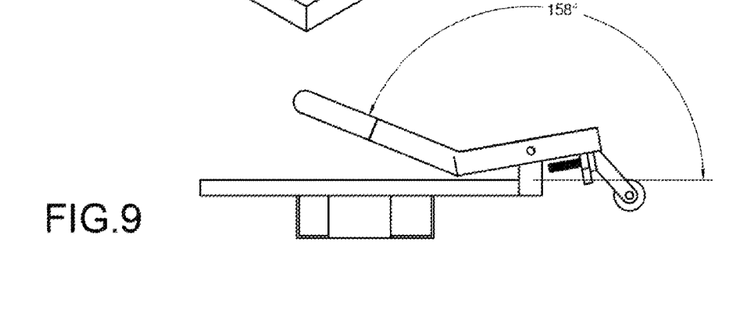
FIG. 9 is a side view of the frame with dual beam completely folded.

FIGS. 4,5,6 illustrates how the rear chassis frame 21 comprising battery cage 27 integrates with the folding dual beam structure 18 at a partially folded position illustrating a clearer view of battery cage 27, kick out fork 25, and kick out wheel 26.

FIGS. 7,8,9,10 respectively shows top view, rear view, side view, and top perspective view of rear chassis frame 21 comprising battery cage 27 connected with dual beam structure 18 in the fully folded position and depicts a clearer view of the said frames' "U" shaped notch that accepts threaded bolt 29.

Figure 11:
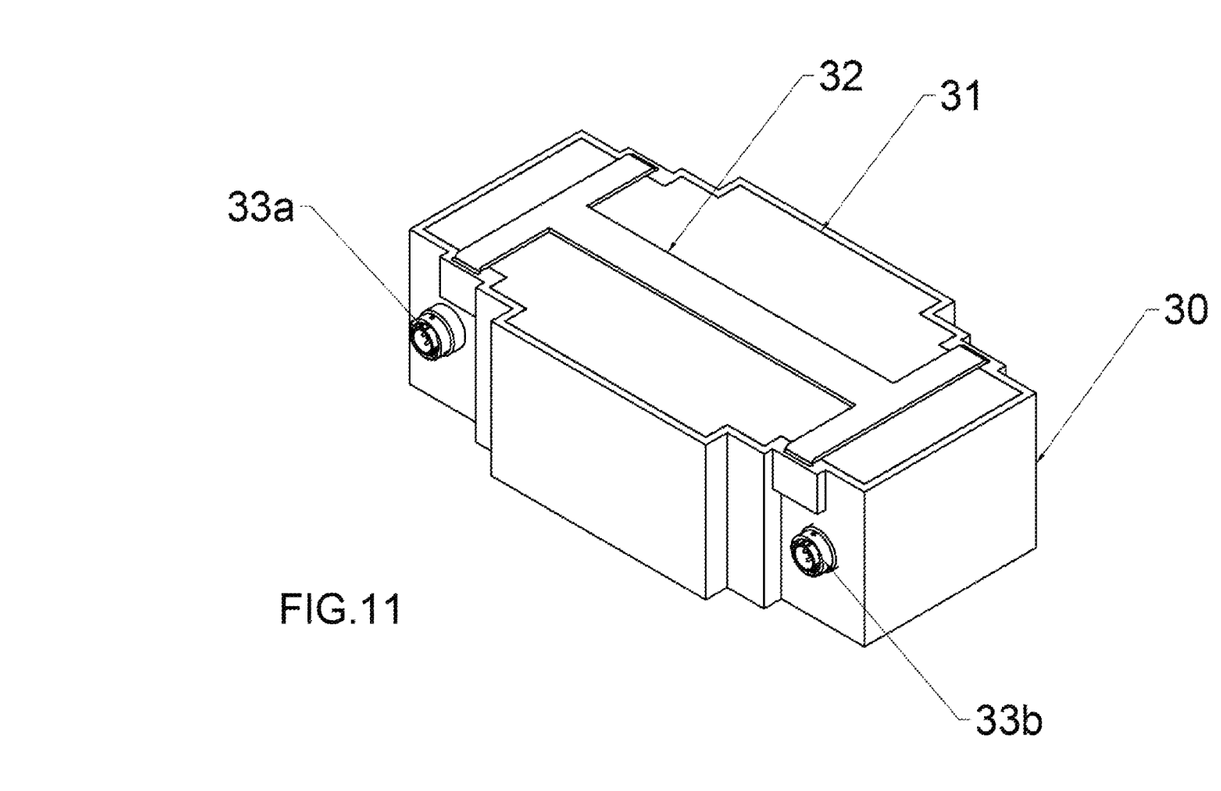
FIG. 11 is top perspective view of the removable battery pack.

FIG. 11 illustrates a top perspective view of the removable battery pack which comprises a plastic battery housing 30, comprising electrical connectors 33*a* and 33*b* whereas 33*b* is a charge port and whereas 33*a* is the power connector to which a wire from Major part 1 (front wheel assembly/chassis) will interconnect the battery pack to the controller, comprising a durable rubber top 31 to cover the batteries, comprising strap 32 to lift the assembled battery pack in and out of battery cage 27. Accordingly, the fully assembled battery pack (Minor part 1) which depending on type of battery ie. Lithium or sealed lead acid may weigh as little as 10 lbs. or up to 38 lbs. providing range of up to 30 miles. Besides adhering to the principle of easy portability by providing the user the option to reduce weight by 10-38 lbs., an easily removable battery pack allows the user to charge the pack away from the EMV which appeals to not only individual users, but to rental, and industrial users who may want to have spare charged battery packs ready to swap out when the current pack is exhausted, thus reducing down time and increasing efficiency.

Figure 12:
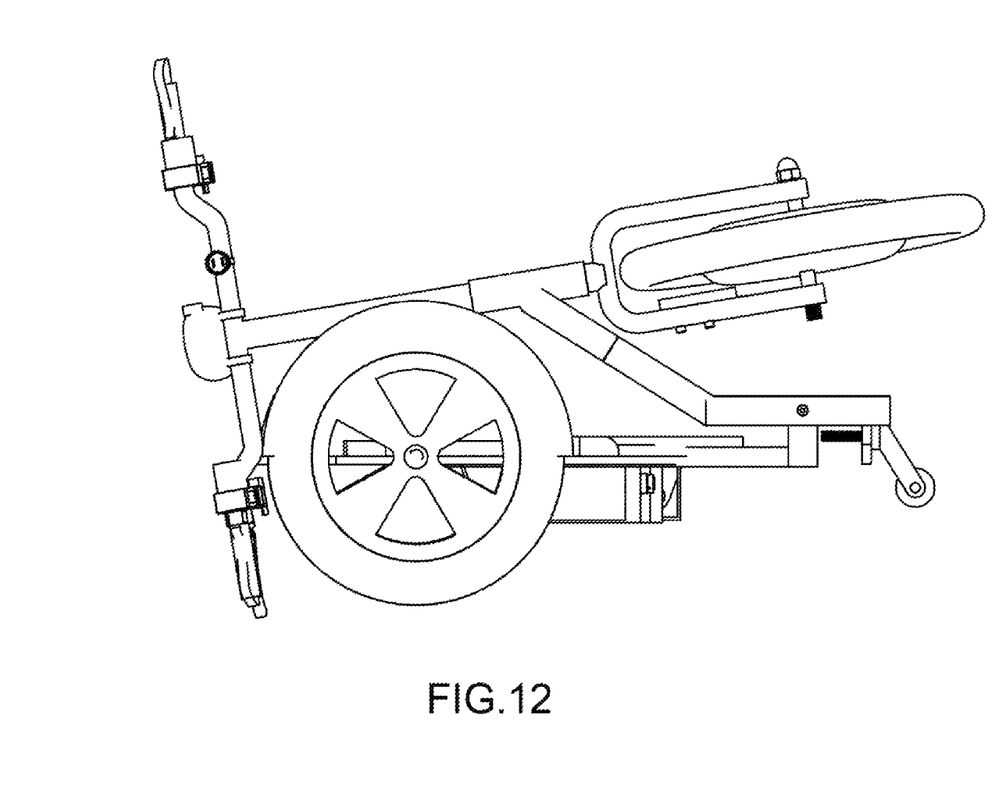
FIG. 12 is a side view with seat removed and EMV folded.

FIG. 12 right side view, illustrates a folded EMV with minor part 2 (removable seat post 24 and seat 22) removed and handlebars fully extended. When folded, the invention presented here drops down to 19", easily fitting in most storage spaces. If user chooses, he/she may also shorten the EMV's length by unclasping hinged folding mechanism 6 and folding handlebar assembly towards the front which is also angled to fold down and to the side. One should note that FIG. 12 shows the EMV in a horizontal position, but when folded in this position, the front of the rear chassis will tilt downward until kick out wheel 26 touches the ground allowing the EMV's folded height to be as low as possible.

Note that as extensive as the summary and description have been, it must be taken as an example only and that the embodiments are simply illustrated of the main principles of the invention, thus they do not limit the process presented herein, since numerous additional modifications, changes, and additions may be made by skilled persons in the area of art, within the category of said principles, and which will embody those principles, falling within the spirit, concept, and scope of this invention.

What is claimed:

1. A multi use, easy to fold, transportable three-wheel electric mobility vehicle, comprising:
 a front wheel drive assembly including an upper sub-part assembly that comprises:
  a telescopic horizontal steering handle;
  a throttle that is fastened to the telescopic horizontal steering handle;
  a brake lever that is fastened to the telescopic horizontal steering handle;
  a multi-function instrument with a headlight and on/off keys that are fastened to the telescopic horizontal steering handle;
  a horn button that is fastened to the telescopic horizontal steering handle;
  a USB charge port that is fastened to the telescopic horizontal steering handle; and
  forward and reverse buttons that are fastened to the telescopic horizontal steering handle;
 a mid sub-part assembly is positioned below the telescopic horizontal steering handle, which comprising:
  a vertical and hollow steering column to which the telescopic horizontal steering handle couples;
  a folding structure to which the steering column is coupled and using which the telescopic horizontal steering handle folds and
  a coupling mechanism that couples the folding structure to a frame head tube
  wherein the mid sub-part assembly connects to a lower sub-part assembly
 a fork assembly comprising a hollow vertical head tube coupled to first and second legs, in which an electric controller is flush mounted on the fork assembly and wherein the vertical head tube couples to the coupling mechanism of the folding structure;
 a front wheel assembly mounted to the fork assembly which comprises:
  an electric hub motor,
  a brake assembly integrated in an electric hub motor wheel, and
  a tire mounted to the electric hub motor wheel,
  wherein the brake assembly connects to a dual beam frame extending outward, backward, and downward from the fork assembly and the vertical head tube;
 a support cross member at a downward bend, respective left and right pivot points below the support cross member and above a rear chassis that connects a front frame assembly to the rear chassis, which includes a bottom crossmember connecting the dual beams frame, a centered upward threaded bolt to lock the front frame to the rear chassis with a hand twist nut into a drivable position;
a rear facing angled set of forks having a small wheel to act as a kick stand;
an electrical pathway connecting power to the electric controller and motor from the rear chassis;
an assembly for the rear chassis comprising:
a flat removable rubber mat on top of a plastic platform with fenders, an electrical input charge port that connects to a battery box under the plastic platform,
an access opening for a removable battery box;
in which the plastic platform includes a rectangular frame having a coupling mechanism for a seat post,
a recessed cage to house a battery pack,
a rear axle mounted behind the recessed cage, and
left and right rear wheels assembled each on a respective ends of the rear axle,
a centered "U" shaped notch in the front of a chassis frame,
respective left and right upward facing posts, in which the left and right upward facing posts comprise left and right pivot points to respectively connect the front frame assembly to the rear chassis; and
wherein within the frame houses a battery pack, in which the batter pack includes a battery, an electrical connection between the charge port of the plastic platform, an electrical connection between the battery box and the electrical pathway either through or along the dual beams to the front wheel drive assembly.

2. The three-wheel electric mobility vehicle of claim 1, further comprising a dual beam support structure extending and connecting from the front wheel assembly to the rear chassis.

3. The three-wheel electric mobility vehicle of claim 2 whereby the dual beam support structure connects to the rear chassis with the left and right pivot points.

4. The three-wheel electric mobility vehicle of claim 3, wherein the rear chassis includes respective left and right vertical posts with respective left and right pivot points that mate with respective pivot points associated with the dual beam support structure of claim 3.

5. The three-wheel electric mobility vehicle of claim 2, wherein the dual beam support structure includes a threaded bolt to secure the dual beam support structure in place.

6. The three-wheel electric mobility vehicle of claim 5, wherein the rear chassis includes a centered "U" shaped notch in a front of the rear chassis frame to allow threaded bolt to swing into or out of a locking position with a hand twist nut.

7. The three-wheel electric mobility vehicle of claim 2, wherein the dual beam support structure includes a kick out wheel to support a scooter when folding.

* * * * *